US008184563B2

(12) United States Patent
Riley et al.

(10) Patent No.: US 8,184,563 B2
(45) Date of Patent: *May 22, 2012

(54) SELECTING A POSITION FIX TO DETERMINE THE LOCATION OF A WIRELESS COMMUNICATION DEVICE

(75) Inventors: Wyatt Thomas Riley, Chesterbrook, PA (US); Mark Leo Moeglein, Ashland, OR (US); Zoltan F. Biacs, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,293

(22) Filed: Dec. 15, 2010

(65) Prior Publication Data

US 2011/0105149 A1    May 5, 2011

Related U.S. Application Data

(63) Continuation of application No. 10/565,993, filed as application No. PCT/US2004/023694 on Jul. 23, 2004, now Pat. No. 7,911,988.

(60) Provisional application No. 60/489,653, filed on Jul. 23, 2003.

(51) Int. Cl.
*H04B 7/00* (2006.01)
*G01C 21/00* (2006.01)
*G01S 19/46* (2010.01)
*G08G 1/123* (2006.01)

(52) U.S. Cl. ........... 370/310.2; 342/357.29; 340/995.17; 701/213

(58) Field of Classification Search .......... 342/350–903, 342/988, 991; 701/116–226; 370/310–345; 455/343.1, 414.3, 456.3; 340/988–996
See application file for complete search history.

(56) References Cited

U.S. PATENT DOCUMENTS

| 5,323,163 | A |   | 6/1994 | Maki |
| 5,812,087 | A |   | 9/1998 | Krasner |
| 5,928,324 | A |   | 7/1999 | Sloan |
| 5,982,324 | A | * | 11/1999 | Watters et al. ........... 342/357.29 |
| 6,081,229 | A |   | 6/2000 | Soliman et al. |
| 6,289,280 | B1 | * | 9/2001 | Fernandez-Corbaton et al. ............... 701/214 |
| 6,516,270 | B2 |   | 2/2003 | Pavlak et al. |
| 7,911,988 | B2 | * | 3/2011 | Riley et al. ............. 370/310.2 |
| 2002/0022927 | A1 |   | 2/2002 | Lemelson et al. |
| 2003/0125045 | A1 |   | 7/2003 | Riley et al. |

OTHER PUBLICATIONS

International Search Report and Written Opinion—PCT/US2004/023694, International Search Authority—European Patent Office—Mar. 7, 2005.
Supplemnetary Partial European Search Report—EP04757233, Search Authority—Munich Patent Office, Aug. 18, 2011.
Yasuo Tamachi, et al., "Various Next-Generation GPS Positioning Systems," Information Processing, Japan, Information Processing Society of Japan, August in 2002, vol. 43, No. 8, p. 845-851.

* cited by examiner

*Primary Examiner* — Afsar M. Qureshi
(74) *Attorney, Agent, or Firm* — Shyam K. Parekh; Mary A. Fales

(57) ABSTRACT

Different types of position fixes may be used to determine the location of a mobile station in a wireless communication system. The position fixes include terrestrial, or network, based techniques, and non-network based techniques, such as satellite, based techniques. An apparatus and method are presented by which different position fixes may be selected, based on the performance of a particular position fix in a particular mobile remote unit.

51 Claims, 5 Drawing Sheets

SELECTING A POSITION FIX TO DETERMINE THE LOCATION OF A WIRELESS COMMUNICATION DEVICE

RELATED APPLICATIONS

This application is a continuation of application Ser. No. 10/565,993, filed Apr. 3, 2007 now U.S. Pat. No. 7,911,988, which is the National Stage of International Application No. PCT/US04/23694, filed Jul. 23, 2004, which claims the benefit of Provisional Application No. 60/489,653, filed Jul. 23, 2003, which are assigned to the assignee hereof and which are expressly incorporated herein by reference.

BACKGROUND OF THE INVENTION

1. Field of the Invention

The invention relates generally to control of communication devices in a wireless communication system, and more particularly, to selecting a desired position fix to determine the geographic location of a device in a communication system.

2. Description of the Related Art

Many different types of wireless systems for communications exist, such as cellular networks for telephone communication, broadband Personal Communication Services (PCS), wireless local-area networks (LANs), satellite communication systems, and two-way radio systems. Typically, these wireless systems include fixed infrastructure, having one or more communication devices, and remote units that may be either fixed or mobile. Examples of mobile remote units, also called mobile stations (MS), include cellular telephones, satellite telephones, wireless communication enabled personal computers, personal digital assistants (PDA), and other wireless devices. Fixed remote units can include, for example, wireless local loop (WLL) stations.

Typically, the infrastructure of a wireless system includes one or more BTS transceiver system (BTS) units, at fixed locations, that communicate with the MSs. The BTSs may also communicate with fixed remote units, each other, and/or an external network.

In many situations it is desirable to determine the location of an MS. For example, many location based services (LBS) communicate particular information to an MS user based on the location of the MS. For instance, an LBS may provide an MS user with driving directions to a destination identified by the user based on the user's location, or a LBS may provide information about a current sales promotion if the user is located in close proximity to a store where the sale is taking place. Many other LBS services exist, including, for example, gaming, security, and fleet management.

Another motivation for determining the location of an MS is to support wireless carriers in complying with a U.S. Government Federal Communications Commission (FCC) regulation that requires carriers in the United States to be able to locate the position of a cellular telephone making an emergency "911" call within 50 meters for 67 percent of such calls and within 150 meters for 95 percent of such calls.

There are a variety of different techniques to determine a geographic position fix of an MS in a wireless communication system. Generally, the different techniques fall into two categories, referred to as terrestrial, or network based, and non-network based, which includes satellite-based data.

Terrestrial or network based techniques, in general, involve information about signals transmitted between an MS and the wireless communication system network, or infrastructure with which the MS operates. An example of such network based fixes includes measuring the time of arrival (TOA) of an MS signal received at two different fixed receivers within the network. The difference in the time of arrival of the same transmitted signal at the respective different receivers defines a hyperbola upon which the MS is located.

Another network based fix involves measuring the time difference of arrival (TDOA) of pilot signals, that are synchronized to each other, and that are transmitted from different transmitters in the network to the MS.

In addition, most cellular system infrastructure antennas are sectorized and use a unique transmission signal for each sector. Identifying the unique transmission signal provides information of the angle of arrival (AOA) of the signal at the MS.

Another network based technique measures the round trip delay (RTD) of a signal transmitted from the network to the MS and back to the network. The RTD of a signal provides information of the range of the MS from the network transmitter/receiver.

Non-network based techniques employ information from sources other than from the wireless network. For example, an MS can gather information from satellites of a satellite positioning system (SPS), such as the US global positioning system (GPS), or from land based transmitters of the long range navigation (LORAN) system, or other navigation systems.

If a non-network technique uses GPS, the MS acquires signals transmitted from at least four GPS satellites to determine a three dimensional position fix, or uses at least three satellites to determine a location if an altitude is assumed. By measuring the phase of the received GPS signals, and demodulating the navigation message on the GPS signal to recover the "ephemeris" data defining the location of the satellites, the location of the MS can be determined.

The network and non-network based techniques can be combined in a hybrid technique to improve the determination of the location of an MS. For example, in rural and suburban regions there may not be multiple network transmitters and receivers within range of the MS, so that a network based technique will not provide a position fix. However, in the same rural and suburban regions, a non-network based technique, such as GPS, will usually be able to acquire signals from four or more satellites and can determine a location.

Conversely, in dense urban regions and inside buildings, GPS receivers may not detect a sufficient number of satellite signals to be able to determine a location. However, in these areas there is usually adequate installed network infrastructure so that the MS is within range of two or more BTSs. In other words, the hybrid technique takes advantage of information that is already available to both the MS and the wireless network, i.e. network based techniques, and combines it with navigation information from outside the network, i.e. non-network based techniques, to improve determining the location of the MS.

Different approaches to obtaining a position fix can be implemented to determine the geographic location of an MS in a communication system. The relative performances of the different approaches, as applied to any particular MS and type of wireless communications system, will depend, at least in part, on characteristics of the geographic region where the MS is located. Therefore, it would be desirable to select a position fix based on the performance of the position fix technique in the environment in which the MS is located.

SUMMARY

A method and apparatus for determining a geographic location of a remote unit in a wireless communication system includes determining a first position fix of the remote unit using a first set of location data and determining a second position fix of the remote unit using a second set of location data. A selection is made between the first position fix and the second position fix based on a predetermined selection criteria.

The first set of location data can include network-based measurements, such as including pilot phase measurements, a round trip delay measurement, and an angle of arrival measurement. The second set of location data can include non network-based measurements, such as satellite based measurements including global positioning system (GPS) measurements.

Selecting between the first position fix and the second position fix can include comparing respective figures of merit for the two position fixes, for example, by comparing the relative horizontal estimate of position error of the respective position fixes. Also, the selection can be biased in favor of one of the position fixes, for example, a GPS fix, unless an error metric of the other location is less than a threshold value, at which the other position fix can be selected.

DETAILED DESCRIPTION

Figure 1:
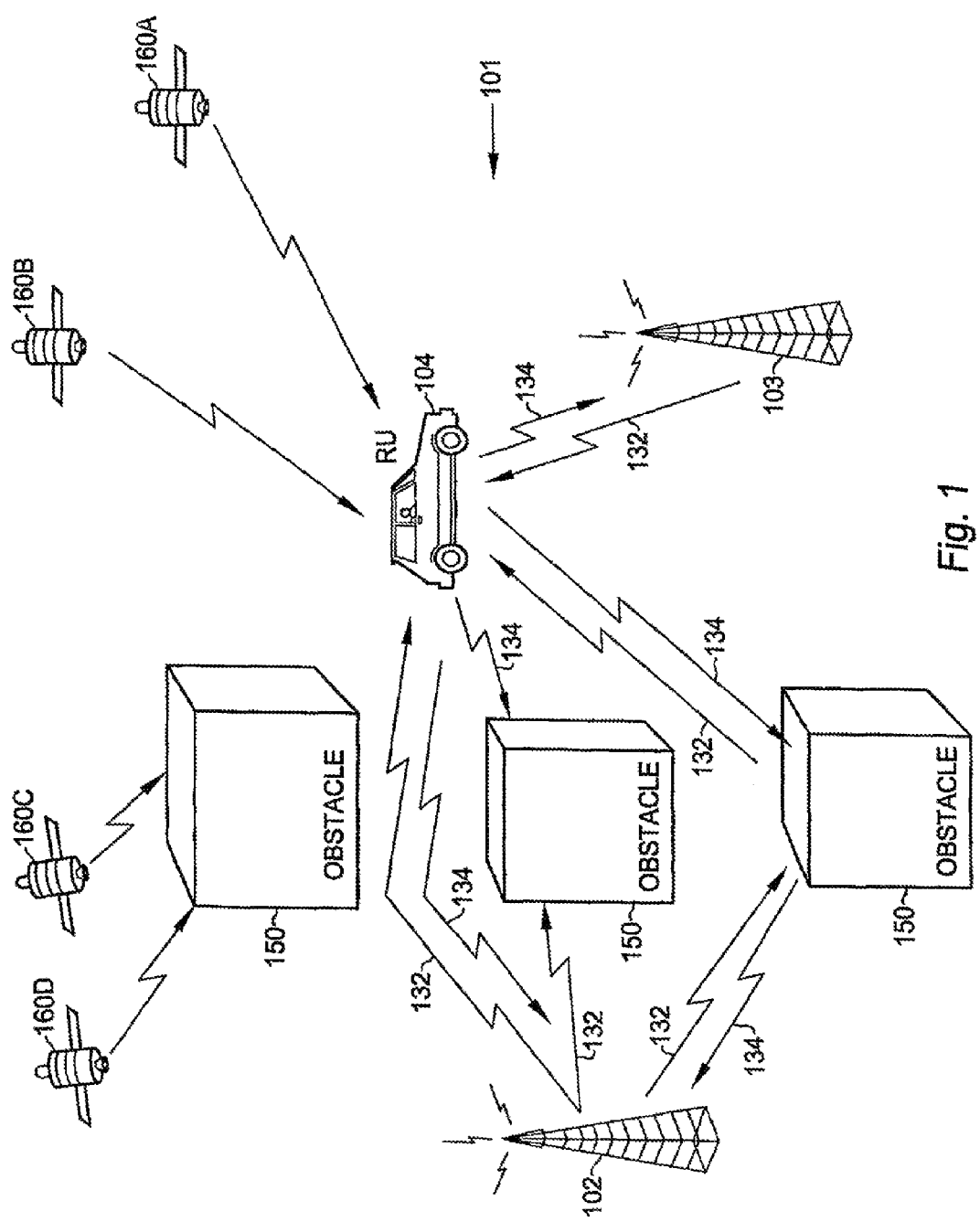
FIG. 1 is a block diagram illustrating portions of a wireless communication system.

FIG. 1 is a block diagram illustrating portions of a wireless communication system 101 that exemplify one embodiment of the invention. The wireless communication system 101 includes a wireless network infrastructure with multiple BTSs 102, and multiple mobile stations MS 104 (only one MS being illustrated in FIG. 1 for simplicity). Examples of MS 104 include cellular telephones, satellite telephones, wireless communication enabled personal computers, personal digital assistants (PDA), and other wireless devices.

The wireless communication system 101 may be designed to support one or more wireless standards. For example, the standards may include TIA/EIA-95-B (IS-95), TIA/EIA-98-C (IS-98), 3rd Generation Partnership Project (3GPP); 3rd Generation Partnership Project 2 (3GPP2), TIA/EIA/IS-2000 (cdma2000), Wideband CDMA (WCDMA), and others. In general, the techniques described herein can be used in any communication system conducted over analog or digital links and any communication system access technique, including time division multiple access (TDMA), frequency division multiple access (FDMS), code division multiple access (CDMA), or any other multiple access technique.

In general, signals 132 transmitted from a BTS 102 to an MS 104 are referred to as being transmitted in the direction of the forward link, while signals 134 transmitted from an MS 104 to a BTS 102 are referred to as being transmitted in the direction of the reverse link.

As illustrated in FIG. 1, signals that travel in the forward link and the reverse link can travel different, multiple paths between a BTS 102 and an MS 104. For example, forward and reverse link signals may be reflected off obstacles 150, resulting in multiple instances of the signal being received at the BTS 102 and at the MS 104. These multiple signal instances are commonly referred to as "multipath" signals. In addition to reflecting signals. On the other hand, an obstacle can completely block signals transmitted between a BTS 102 and an MS 104.

A multipath signal environment presents challenges to the accuracy or reliability of many of the possible position fix techniques. For example, if the signals that travel between the BTS 102 and the MS 104 travel a "multipath" signal route, then position fixes that use signal travel time, such as the RTD, will be in error because the signal has traveled a path that is greater than the actual distance between the BTS 102 and the MS 104. Likewise, a position fix that uses the TDOA of pilot signals from different BTSs will be in error because the time of travel of the signal will depend on the multipath distance, which is different than the actual distance between the BTS 102 and the MS 104. Multipath can even cause an error in a position fix if the multipath is such that the signal received by an MS 104 originated in a different sector of the cell than the sector in which the MS is actually located. In addition to these problems, the multipath environment can result in decreased signal levels so that an MS 104 cannot receive signals from multiple BTSs 102.

Obstacles 150 also can interfere with the MS 104 reception of satellite signals. FIG. 1 illustrates four GPS satellites 160A-D. If there were no obstructions 150, the MS 104 would be able to receive signals from all four satellites 160A-D. However, the signal paths of two of the satellites 160C-D to the MS 104 are blocked by the obstacles 150. In this example, the MS 104 is only able to receive signals from two satellites 160A-B and therefore a position fix cannot be determined based solely on GPS, because a minimum of four satellites are required for a three dimensional GPS position fix. Examples of obstacles 150 include buildings, trees, cars, and people.

Figure 2:
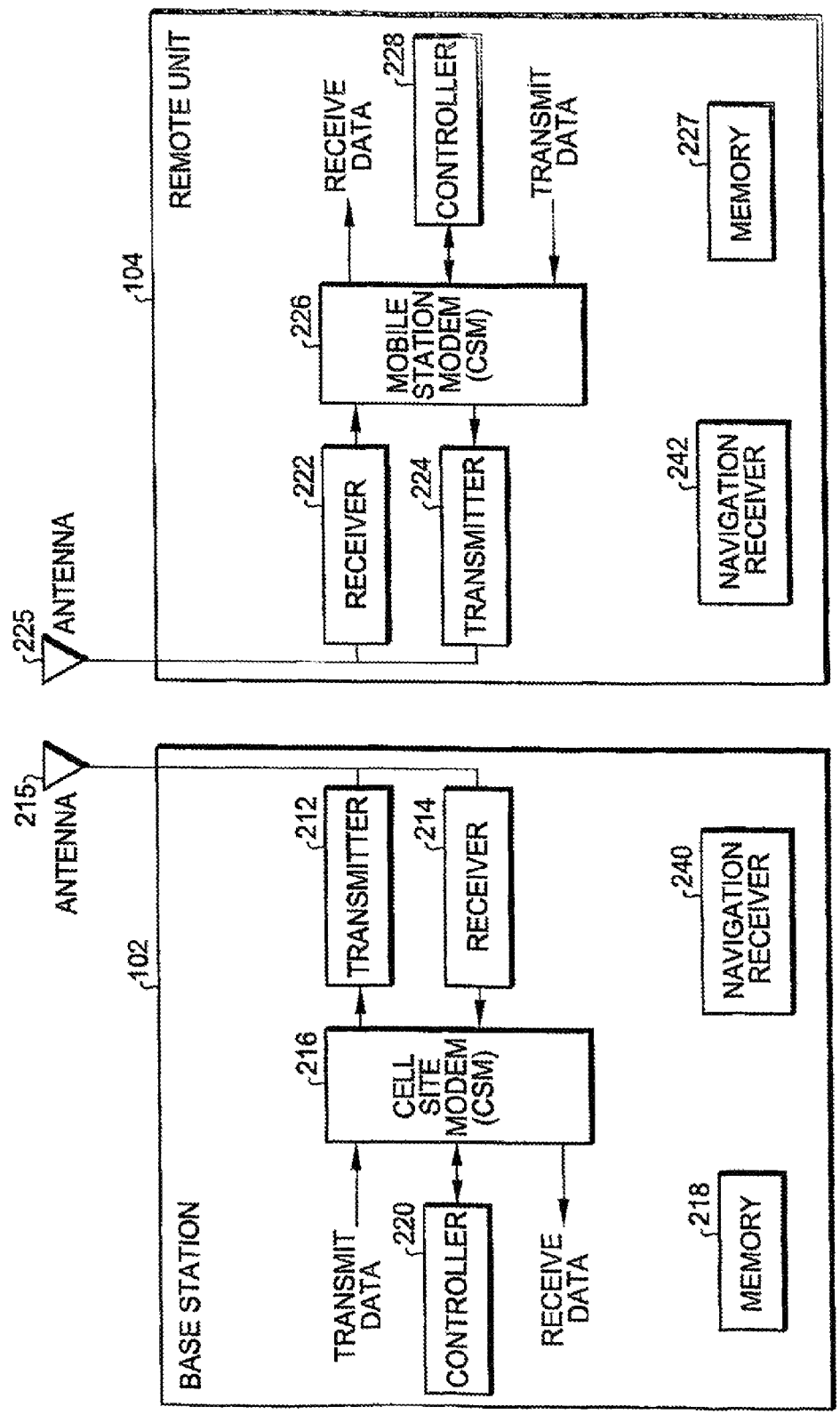
FIG. 2 is a block diagram illustrating additional detail of portions of the wireless communication system shown in FIG. 1.

FIG. 2 is a block diagram illustrating additional detail of portions of the wireless communication system 101 shown in FIG. 1. The system 101 includes a BTS 102 and an MS 104. Included in the BTS 102 is a transmitter 212, a receiver 214, an antenna 215, a cell site modem (CSM) 216, a memory block 218, and a controller 220. The MS 104 includes a receiver 222, a transmitter 224, an antenna 225, a mobile station modem (MSM) 226, a memory block 227, and a controller 228. The memory blocks 218 and 227 store, among other things, program instructions. Execution of the program instructions stored in the BTS memory block 218 and the MS memory block 227 by the BTS controller 220, or the MS controller 228, respectively, can cause the BTS 102 or MS 104 to operate in the manner described herein.

The BTS 102 can include a navigation receiver 240, the MS 104 can include a navigation receiver 242, or both the BTS 102 and the MS 104 can include navigation receivers 240, 242, respectively. Examples of navigation receivers that may be included in the BTS 102 and the MS 104 include GPS receivers, LORAN receivers, "Galileo" receivers, Global Navigation Satellite System (GLONASS) receivers, or the like.

Figure 3:
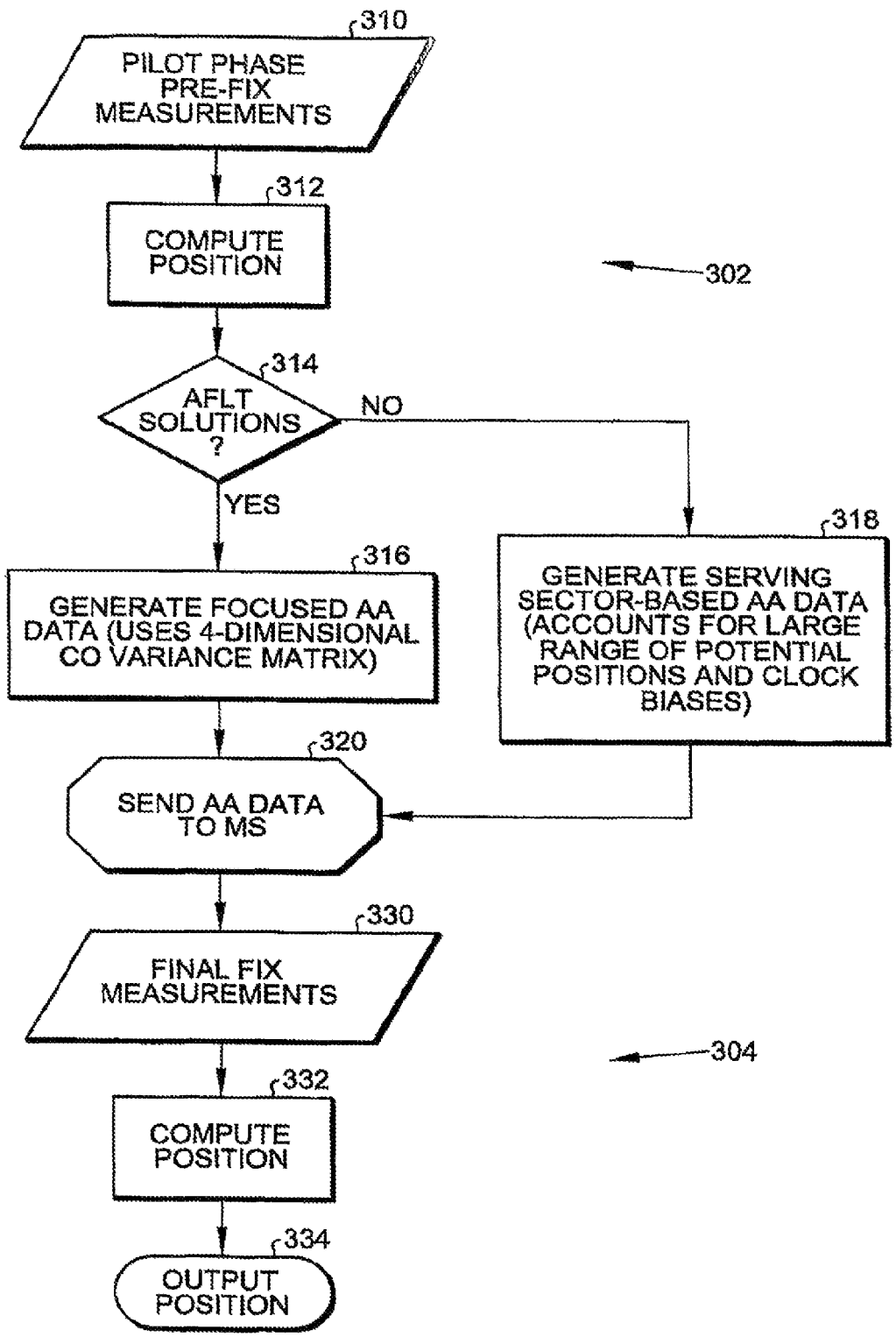
FIG. 3 is a flow chart illustrating steps for determining a location of an MS.

FIG. 3 is a flow chart illustrating operations for determining a geographic location of an MS 104. The operations 310-312 are performed to determine a pre-fix location 302 and operations 330-332 are performed to determine a final-fix location 304.

To determine a pre-fix location 302, operation begins in block 310, where pilot phase measurements are made in the MS. Flow continues to block 312 where, using the pilot phase measurements made in the MS and other network-based measurements, a position fix of the MS 104 is determined in a location determination device that includes a location engine. The location engine may be in any device that communicates with the network. For example, the location engine may be in the MS, in a server connected to the network, or in another remote unit.

Flow continues to block 314 where it is determined if the computed position fix was an advantaged forward link trilateration (AFLT), i.e. a position fix based on the pilot phase measurements, or if the position fix was based on other network measurements. In general, a position fix based on AFLT is more accurate than a position fix based on other network based measurements, such as serving cell information. The pre-fix location of the MS can be used to generate acquisition assistance data used by the MS in making future measurements. Depending on the type of information used in determining the MS location, different sets of acquisition assistance data can be generated. For example, if the MS has a GPS receiver, the acquisition assistance data might include approximate phase measurements and Doppler shift for the satellite signals that the MS will receive.

In block 314, if the MS position fix was based on AFLT, flow continues to block 316. In block 316 a set of focused acquisition assistance data is generated. The acquisition assistance data can be generated, for example, using a 4-dimensional covariance matrix.

Returning to block 314, if the MS location is not based on AFLT, flow continues to block 318. At block 318, because the position fix is not based on AFLT, the determination of the location of the MS 104 is considered to be not sufficiently accurate, so a set of less focused acquisition assistance data is generated that accounts for this uncertainty. Flow from blocks 316 and 318 continues to block 320 where the acquisition assistance data is transmitted to the MS.

In determining a final-fix location 304 in block 330, the MS uses acquisition assistance data and makes final-fix measurements. For example, if the MS 104 has a GPS receiver, the MS may use the acquisition assistance data to measure GPS signals. The final-fix measurements are transmitted to the location determination device. Flow continues to block 332 where, using the final-fix measurements and any other measurements available, a position fix of the MS 104 is determined Flow continues to block 334 where a final location of the MS is produced.

Figure 4:
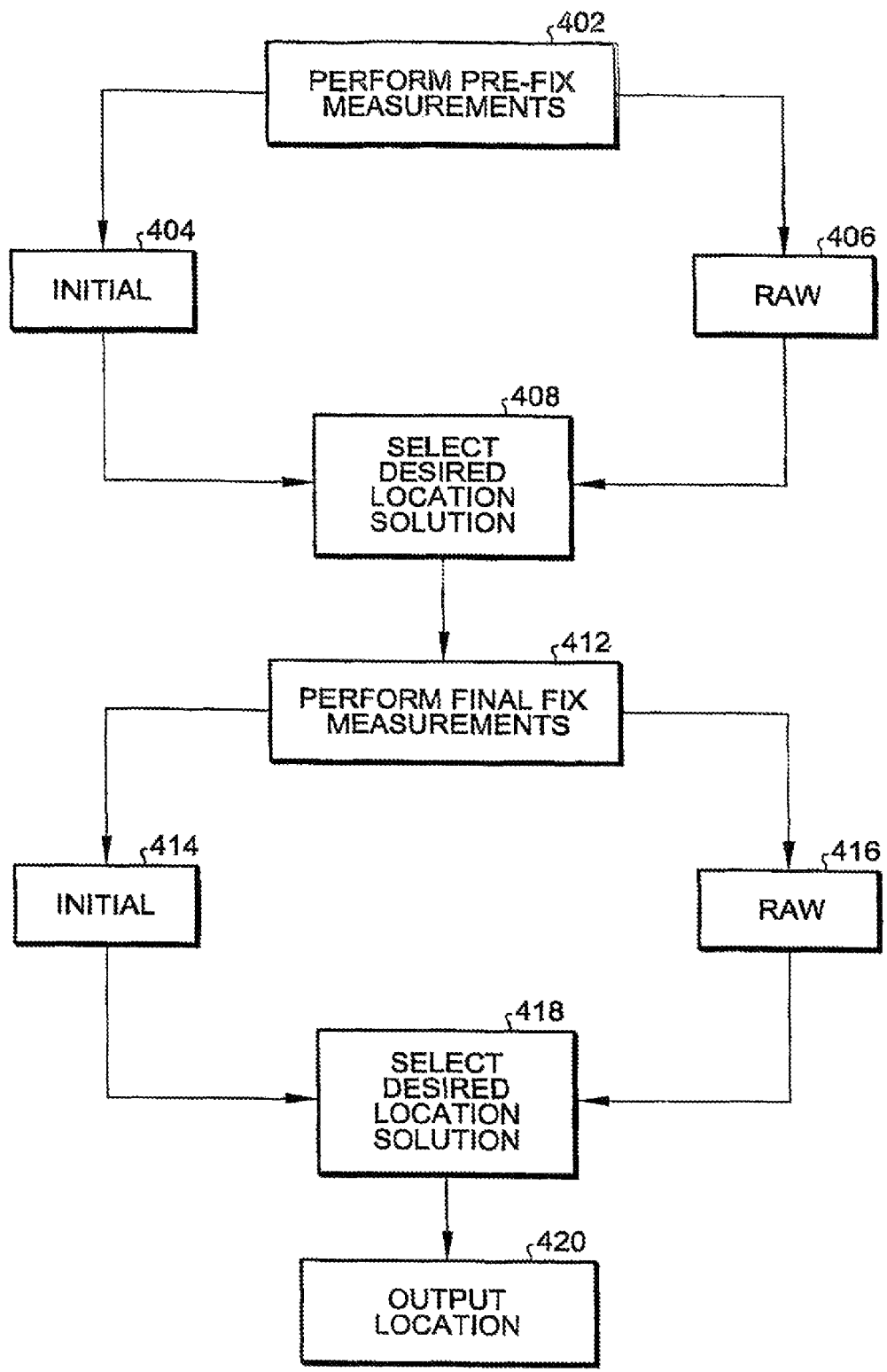
FIG. 4 is a flow diagram illustrating additional detail of a method of determining a location of an MS.

FIG. 4 is a flow diagram illustrating additional detail of a method of determining geographic location of an MS. Operation begins in block 402 where a set of pre-fix measurements are made at the MS and are transmitted to the network. Flow continues to blocks 404 and 406 where a "pre-fix" location determination is generated by a location engine. The location engine can be part of any device that communicates with the network. For example, the location engine can be provided by operating software in a server connected to the network infrastructure or it can be provided by operating software in the MS.

In block 404 an "initial" coarse pre-fix determination is produced using mixed cell network measurements. For example, the initial pre-fix may determine a location based on identification of BTSs, or cells, with which the MS is communicating, or the location can be determined based on measurements of signal power level of signals received from the MS, or based on RTD.

In block 406 a "raw" more precise pre-fix determination is produced based on additional network and non-network based measurements. For example, the raw pre-fix determination may be based on pilot phase measurements of signals transmitted between the MS and the BTSs in the network In addition, a raw pre-fix determination may be based on satellite signals, such as GPS, as measured by the MS.

After the initial and raw pre-fix locations are determined, flow continues to block 408. At block 408 either the initial or raw pre-fix position is selected and used as an input to an operation that generates acquisition assistance data. The selection between the initial and raw pre-fix positions can be based on relative figures of merit as to the accuracy of the pre-fix positions. For example, the selection can be based on a horizontal estimated position error (HEPE), receiver autonomous integration measurement (RAIM), some ranking of the two pre-fix positions, or other appropriate measure. The output of the pre-fix selection process can also be a weighted average of the initial and raw pre-fix positions rather than a selection of one or the other. Using the pre-fix position, acquisition assistance data is generated, such as GPS search window and Doppler estimates. Block 408 operation continues when the acquisition assistance data is transmitted to the MS.

Flow continues to block 412 to produce a final fix. In block 412 the MS, using the acquisition assistance data, collects location data. For example, the MS may collect data from GPS signals. The final-fix data are transmitted to the location engine.

Flow continues to blocks 414 and 416 where, using the final-fix data and any other data available, the location engine determines a geographic location of the MS. In block 414 an "initial" final fix is determined. Typically, the initial final fix position is the output of the pre-fix from block 408, but the "initial" final fix position can be supplemented with additional network based measurements. For example, additional pilot phase measurements may be used to refine the "initial" final fix position. In block 416 a "raw", more precise final-fix position is determined based on additional network and non-network based measurements. For example, the "raw" final-fix position may be determined based on GPS signals or additional pilot phase measurements. In addition, the "raw" final fix position may be a hybrid position fix in which network and non-network measurements are combined to determine a "raw" final fix.

Determination of whether the "raw" final fix position is based on non-network measurements, e.g. GPS, or is based on a hybrid position fix, e.g. GPS and network measurements, can be based on an evaluation of the merits of the respective measurements. For example, if a non-network only "raw" final fix position has an estimated error above a predetermined value then a hybrid position fix may be preferred.

A predetermined selection value can be used to bias the determination of the "raw" final fix position to a preferred type of position fix, for example between non-network based and hybrid position fixes. In other words, the magnitude of a predetermined selection value can ensure that the preferred type position fix is used for producing a position fix in a majority of situations. For example, if the selection between non-network and hybrid position fixes is based on the magnitude of the estimated error of a non-network based position fix being less than a predetermined position fix value, then the use of a greater value for the predetermined selection value will bias the selection in favor of the non-network based position fix. Conversely, a lesser value for the predetermined selection value will bias the selection in favor of the hybrid based position fix.

For example, a horizontal estimate of position error (HEPE) of a position fix can be evaluated to select between a non-network based position fix and a hybrid position fix for the "raw" final fix position. It has been found that if a non-network based position fix is a GPS position fix, then using the GPS position fix if it has an HEPE of 500 meters or less provides good results. In general, a GPS position fix will have an HEPE of less than 500 meters, so using an HEPE of 500 meters for the predetermined selection value will bias the selection in favor of selecting the GPS position fix.

Another technique for selecting between a GPS-only position fix and a hybrid position fix can be based on the HEPE of the GPS position fix and the HEPE of the "initial" final fix position. For example, if the GPS position fix has an HEPE that is less than the predetermined selection value and less than the "initial" final-fix HEPE, then the selection will be to use the GPS-only position fix, otherwise the selection will be to use a hybrid position fix. In this example, if the predetermined selection value is an HEPE of 500 meters, then the GPS-only position fix is used if the GPS position fix HEPE is less than 500 meters and less than the HEPE of the "initial" final-fix, otherwise a hybrid position fix is used.

Flow continues from blocks 414 and 416 to block 418. In block 418 a selection between the "initial" and "raw" final-fix positions is made. Selection between the "initial" and "raw" final-fix position may be based on a figure of merit for each of the position fixes. For example, selection between the "initial" and "raw" final-fix positions can be based on which of the position fixes has a lower HEPE. In addition, the initial and raw final-fix positions may be combined, such as with a weighted average, to determine a final-fix position. After selecting a final-fix position, flow continues to block 420 where the final location is output.

Figure 5:
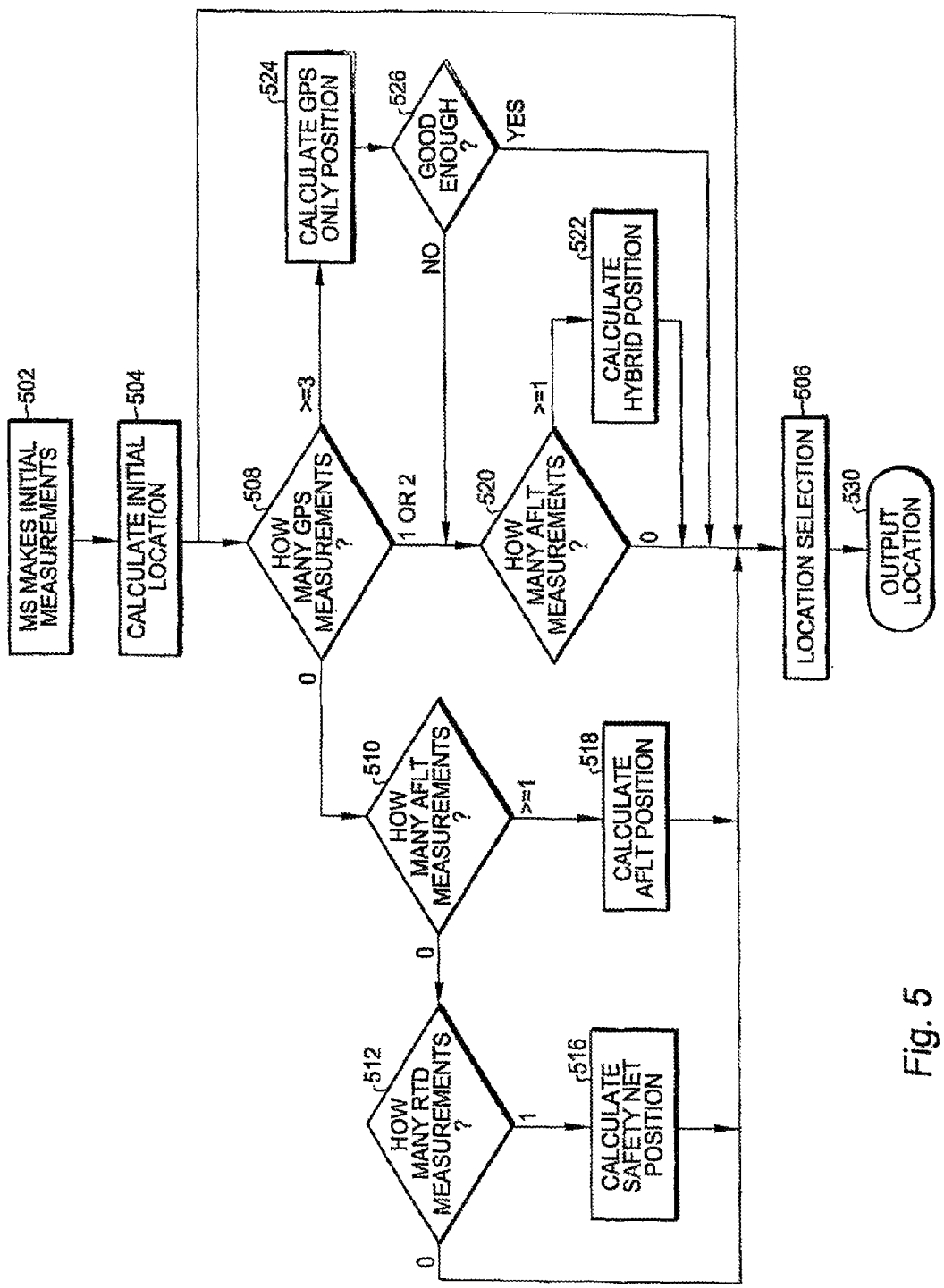
FIG. 5 is a flow diagram illustrating additional aspects of a method of determining a location of an MS.

FIG. 5 is a flow diagram illustrating additional aspects of determining a geographic location of an MS. Flow begins in block 502 where an MS makes initial position measurements. Examples of the types of measurements that the MS makes include pilot phase measurements, BTS identification, and GPS measurements. The initial measurements made by the MS are transmitted to a BTS, another MS, or any device within the network infrastructure.

Flow continues to block 504 where the initial measurements are received and a location engine calculates an initial location of the MS. The calculation of the initial MS location may be based on the measurements received from the MS, other network based measurements, or a combination of the various measurements. In determining the initial location of the MS, an initial assumption of the MS location can be made, for example, the initial MS location can be taken to be the previous location of the MS. Measurement residuals can then be used to update the location estimate. The residuals can be derived from different "iteration" solvers, such as, least mean squares including pilot reweighting, orthogonals, delta vector limiting, as well as algebraic solvers. Examples of some techniques for determining the MS location based on an initial coarse position estimate from the MS, which is derived based on initial estimates of the MS location, are described in U.S. Pat. No. 6,570,530 entitled "METHOD AND APPARATUS PROVIDING IMPROVED POSITION ESTIMATE BASED ON AN INITIAL COARSE POSITION ESTIMATE" issued May 27, 2003 assigned to the assignee of this application.

The initial location calculated in block 504 is simultaneously provided to the location selector block 506 operation and the decision block 508 operation. The selector block 506 receives the initial position fix for later comparison against alternative position fixes as described further below. In block 508 it is determined how many GPS measurements are available.

If there are no GPS measurements available, then flow continues to block 510. In block 510 it is determined how many AFLT measurements are available. If there are no AFLT measurements available, flow continues to block 512. In block 512 it is determined if an RTD measurement is available. If there is no RTD measurement available, then flow continues to block 506.

Returning to block 512, which is entered when there are no GPS or AFLT measurements available, if there is an RTD measurement available then flow continues to block 516. In block 516 a "safety net" location is calculated based on the RTD measurement. The RTD-calculated MS location is output from block 516 and input to the location selector block 506.

Returning to block 510, which is entered if there are no GPS measurements available, it is determined if there are any AFLT measurements available. If there is at least one AFLT measurement available, flow continues to block 518. In block 518 a location of the MS is calculated using the at least one AFLT measurements. The AFLT-calculated MS location is output from block 518 and input to the location selector block 506.

Returning to block 508 where it is determined if any GPS measurements are available, if there are one or two GPS measurements available flows continues to block 520. In block 520 it is determined if there are any AFLT measurements available.

If there are no AFLT measurements available, a "0" outcome, then operation proceeds to the location selector block 506. If, in block 520, it is determined that there is at least one AFLT measurement available then flow continues to block 522. In block 522 the AFLT and GPS measurements are combined to calculate a hybrid location of the MS. The hybrid position fix is input to the location selector block 506.

Returning to block 508, if it is determined that there are at least three GPS measurements available, then flow continues to block 524. In block 524 the GPS measurements are used to calculate the MS location. Flow then continues to block 526. In block 526 it is determined if the GPS location calculation is accurate enough, or if it is desirable to do additional processing to determine the location of the MS. For example, in block 526 the HEPE of the GPS calculation can be compared to a predetermined value to decide if the GPS measurement is accurate enough. Other parameters may also be used to evaluate if the GPS position fix is accurate enough, such as, the signal strength of the received GPS signals and the relative location of the GPS satellites. If it is determined that the GPS measurement is accurate enough, a "Yes" outcome at block 526, then it is provided to the location selector block 506. If the GPS measurement is not accurate enough, a "No" outcome, then flow continues to block 520.

As noted above, in block 520 it is determined if there are any AFLT measurements available. If there are no AFLT measurements available, then the GPS location, calculated in block 522 is input to the location selector block 506. If, in block 520, it is determined that there is at least one AFLT measurement available flow continues to block 522 where the GPS and AFLT measurements are combined to calculate a hybrid location of the MS. The hybrid position fix is input to the location selector block 506.

In selector block 506 all of the position fixes that have been calculated for the MS are evaluated and a desired position fix is selected. The evaluation of the various position fixes can be based on relative figures of merit of the position fixes, such as the HEPE of each measurement. The selection of the desired position fix can also be biased to a preferred position fix type. For example, if a GPS only position fix is preferred, then a predetermined location type selector value can be compared with the HEPE of the GPS position fix and as long as the GPS position fix HEPE is less than the predetermined location type selector value, the GPS position fix will be selected. The predetermined location type selector value can be selected so that a GPS position fix is used a majority of the time.

Another example would be to select the GPS position fix as long as its HEPE is not more than a predetermined amount greater than the HEPE of another position fix type, such as not greater than the other position fix HEPE by more than 30% or 50%. Other selection techniques can also be used, such as selecting the GPS position fix if its HEPE is less than a predetermined value and less than the HEPE of the initial position fix. After the desired position fix has been selected, flow continues to block 530 and the selected location is output.

As noted in the description above, in one embodiment a pre-fix position of the remote unit is determined using at least two types of location measurement position fixes. Then an estimated error for each of the pre-fix positions is determined Selection of a desired pre-fix position is based on the figures of merit of the respective position fixes. A final-fix position of the remote unit is determined using at least one type of location measurement techniques and the selected pre-fix position. A desired final position fix is selected as the geographic location of the remote unit based on respective estimated errors of the desired pre-fix position and the final-fix position.

The pre-fix position can include using mixed cell sector position data, and advanced forward link trilateration data. Selecting a desired pre-fix position can include evaluating a horizontal estimated position error of the position fixes, determining a weighted average of initial position fix, or determining a robustness matrix.

The final-fix location position fix can include using non-network based measurement systems, such as a satellite measurement system like the global positioning system, the GLONASS system, or the Galileo system. Selecting a desired final-fix position includes evaluating a horizontal estimated position error of the position fixes.

A remote unit in accordance with the invention includes a receiver configured to receive signals from a wireless network infrastructure and a transmitter configured to transmit signals to the wireless network infrastructure. The remote unit also includes a controller configured to process signals received from the wireless network and collect data to be used in determining a position fix. The collected data is transmitted to the wireless network, another remote unit, or other location where a position fix is determined. The remote unit includes a navigational receiver, for example a global positioning system receiver, configured to process non network-based signals and collect data to be used in determining a position fix. The data collected is transmitted to the wireless network, another remote unit, or other location where a position fix is determined.

A location determination device in a wireless communication system receives signals from a remote unit, including data produced from network signals and non-network signals to be used in determining a position fix. The device processes the data to determine at least two position fixes, and then selects a desired position fix based on respective figures of merit of the position fixes. In one embodiment, a location engine processes the data to determine the position fixes.

The location determination device can also generate acquisition assistance data based on a position fix processed using network based data and transmit the acquisition assistance data to the remote unit to be used by the remote unit in processing non-network based signals. For example, the acquisition assistance data can assist the remote unit in processing global positioning system signals.

The location determination device can also determine a pre-fix position and a final-fix position, and select a desired final position fix as the geographic location of the remote unit based on respective estimated errors of the location position fixes.

The various illustrative logical blocks, modules, circuits, and algorithm steps described in connection with the embodiments herein may be implemented as hardware, software, or combinations of both.

The various illustrative logical blocks, modules, and circuits described in connection with the embodiments herein may be implemented or performed with a digital signal processor, or equivalent device.

The invention claimed is:

1. A method of determining a geographic position of a remote unit in a wireless communication system, comprising:
   determining a first position solution of the remote unit using a first set of position data;
   determining a second position solution of the remote unit using a second set of position data; and
   selecting between the first position solution and the second position solution based on a predetermined selection criteria, wherein the first position solution and the second position solution are based upon separate measurements.

2. The method of claim 1 wherein the first set of position data include network-based measurements.

3. The method of claim 2 wherein the network-based measurements include pilot phase measurements.

4. The method of claim 2 wherein the network-based measurements include a round trip delay measurement.

5. The method of claim 2 wherein the network-based measurements include an angle of arrival measurement.

6. The method of claim 2 wherein the network-based measurements include a time of arrival measurement.

7. The method of claim 2 wherein the network-based measurements include a time difference of arrival measurement.

8. The method of claim 1 wherein the second set of data include non-network-based measurements.

9. The method of claim 8 wherein the non-network-based measurements include satellite based measurements.

10. The method of claim 8 wherein the non-network-based measurements include global positioning system measurements.

11. The method of claim 8 wherein the non-network-based measurements include geometric dilution of precision measurements.

12. The method of claim 8 wherein the non-network-based measurements include position dilution of precision measurements.

13. The method of claim 8 wherein the non-network-based measurements include horizontal dilution of precision measurements.

14. The method of claim 8 wherein the non-network-based measurements include weighted dilution of precision measurements.

15. The method of claim 8 wherein the non-network-based measurements include solution unit fault measurements.

16. The method of claim 8 wherein the non-network-based measurements include residual magnitudes measurements.

17. The method of claim 1 wherein selecting between the first position solution and the second position solution includes comparing respective figures of merit for the two position solutions.

18. The method of claim 17 wherein comparing includes evaluating the relative horizontal estimate of position error.

19. The method of claim 18 wherein comparing includes evaluating a relative geometric dilution of precision error.

20. The method of claim 18 wherein comparing includes evaluating the relative position of dilution of precision error.

21. The method of claim 18 wherein comparing includes evaluating the relative horizontal dilution of precision error.

22. The method of claim 18 wherein comparing includes evaluating the relative weighted dilution of precision errors.

23. The method of claim 18 wherein comparing includes evaluating the relative unit fault of the solution errors.

24. The method of claim 18 wherein comparing includes evaluating the relative measurement residual magnitudes.

25. The method of claim 18 wherein comparing is biased in favor of one of the position solutions.

26. The method of 25 wherein comparing is biased in favor of one of the position solutions unless an error metric of the other position is less than a threshold value wherein the other position solution is selected.

27. The method of claim 26 wherein the favored position solution is a global positioning system solution.

28. The method of claim 1 wherein the remote unit is a mobile station.

29. A position determination device in a wireless communication system, comprising:
   a position engine configured to receive data produced from network signals and non-network signals and to process the data to determine at least two position solutions, wherein a first position solution and a second position solution are based upon separate measurements; and
   a controller configured to select a desired position solution based on respective figures of merit of the position solutions.

30. The position determination device of claim 29 wherein the controller further includes the position engine.

31. The position determination device of claim 29 wherein the controller is further configured to generate acquisition assistance data based on a position solution processed using network-based data, wherein the acquisition assistance data is used by a remote unit in processing non-network-based signals.

32. The position determination device of claim 31 wherein the acquisition assistance data is generated using cell sector data.

33. The position determination device of claim 31 wherein the acquisition assistance data is generated using roundtrip delay data.

34. The position determination device of claim 31 wherein the acquisition assistance data is generated using angle of arrival data.

35. The position determination device of claim 31 wherein the acquisition assistance data is generated using time of arrival data.

36. The position determination device of claim 31 further including generating two sets of acquisition assistance data.

37. The position determination device of claim 31 wherein the acquisition assistance data assists the remote unit in processing global positioning system signals.

38. The position determination device of claim 29 wherein the data from non-network-based signals include signals from a global positioning system.

39. The position determination device of claim 29 wherein the data from network signals include pilot phase measurements.

40. The position determination device of claim 29 wherein the position determination device is included in a base station.

41. The position determination device of claim 29 wherein the position determination device is included in a wireless network infrastructure.

42. The position determination device of claim 29 wherein the position determination device is included in a remote unit.

43. A non-transitory machine readable medium embodying instructions for determining a geographic position of a remote unit in a wireless communication system, which when executed by a processor causes the processor to
   determine a first position solution of the remote unit using a first set of position data;
   determine a second position solution of the remote unit using a second set of position data; and
   select between the first position solution and the second position solution based on a predetermined selection criteria, wherein the first position solution and the second position solution are based upon separate measurements.

44. The non-transitory machine readable medium of claim 43, embodying instructions when executed by the processor further causes the processor to
   compare respective figures of merit for the two position solutions.

45. The non-transitory machine readable medium of claim 44 wherein comparing is biased in favor of one of the position solutions.

46. The non-transitory machine readable medium of claim 45, wherein comparing is biased in favor of one of the position solutions unless an error metric of the other position is less than a threshold value wherein the other position solution is selected.

47. A position determination device in a wireless communication system, comprising:
   means for receiving data produced from network signals and non-network signals and to process the data to determine at least two position solutions, wherein a first position solution and a second position solution are based upon separate measurements; and
   means for selecting a desired position solution based on respective figures of merit of the position solutions.

48. The position determination device of claim 47 wherein the means for selecting further includes generating acquisition assistance data based on a position solution processed using network-based data wherein the acquisition assistance data is used by a remote unit in processing non-network-based signals.

49. The position determination device of claim 48 wherein the data from non-network-based signals include signals from a global positioning system.

50. A method of determining a geographic position of a remote unit in a wireless communication system, comprising:
   determining a first position solution of the remote unit using a first set of position data;
   determining a second position solution of the remote unit using a second set of position data, wherein the first position solution and the second position solution are based upon separate measurements;
   determining a pre-fix position solution of the remote unit for each of the first set of position data and the second set of position data;
   selecting a desired one of the pre-fix position solutions based on figures of merit of the respective position solutions;
   determining a final-fix position solution of the remote unit using at least one of the first set of position data and the second set of position data, and the selected pre-fix position solution; and selecting a desired final position solution as the position of the remote unit based on respective figures of merit of the desired pre-fix position solution and the final-fix position solution.

51. An apparatus for determining a geographic position of a remote unit in a wireless communication system, comprising:
- means for determining a first position solution of the remote unit using a first set of position data;
- means for determining a second position solution of the remote unit using a second set of position data, wherein the first position solution and the second position solution are based upon separate measurements;
- means for determining a pre-fix position solution of the remote unit for each of the first set of position data and the second set of position data;
- means for selecting a desired one of the pre-fix position solutions based on figures of merit of the respective position solutions;
- means for determining a final-fix position solution of the remote unit using at least one of the first set of position data and the second set of position data, and the selected pre-fix position solution; and
- means for selecting a desired final position solution as the position of the remote unit based on respective figures of merit of the desired pre-fix position solution and the final-fix position solution.

* * * * *